United States Patent
Aoyama et al.

(10) Patent No.: US 8,293,055 B2
(45) Date of Patent: Oct. 23, 2012

(54) MANUFACTURING METHOD OF A VEHICULAR INTERIOR PART

(75) Inventors: Mitsuharu Aoyama, Kariya (JP); Masao Tada, Kariya (JP)

(73) Assignee: Toyota Boshoku Kabushiki Kaisha, Aichi (JP)

( * ) Notice: Subject to any disclaimer, the term of this patent is extended or adjusted under 35 U.S.C. 154(b) by 251 days.

(21) Appl. No.: 12/731,454

(22) Filed: Mar. 25, 2010

(65) Prior Publication Data

US 2010/0193108 A1 Aug. 5, 2010

Related U.S. Application Data

(63) Continuation-in-part of application No. 11/707,869, filed on Feb. 20, 2007, now abandoned.

(30) Foreign Application Priority Data

Feb. 21, 2006 (JP) .................................. 2006-044076

(51) Int. Cl.
B32B 7/08 (2006.01)

(52) U.S. Cl. ....................................................... 156/245

(58) Field of Classification Search .................... 156/71, 156/196, 212, 213, 288, 229, 232, 237, 241, 156/242, 245

See application file for complete search history.

(56) References Cited

U.S. PATENT DOCUMENTS

| 4,040,881 | A | 8/1977 | Wallace |
| 5,336,352 | A | 8/1994 | Tokura |
| 5,382,398 | A | 1/1995 | Draximaier, Jr. |
| 6,182,957 | B1 | 2/2001 | Becker |
| 2003/0168151 | A1* | 9/2003 | Wright et al. .................... 156/93 |
| 2003/0228456 | A1 | 12/2003 | Hehl |

FOREIGN PATENT DOCUMENTS

| EP | 1 334 818 | 8/2003 |
| JP | 02-178020 | 7/1990 |
| JP | 04-97832 | 3/1992 |
| JP | 6-71318 | 10/1994 |
| JP | 06-71318 U | * 10/1994 |
| JP | 2002-79852 | 3/2002 |
| JP | 2005-225391 | 8/2005 |

* cited by examiner

*Primary Examiner* — Daniel McNally

(74) *Attorney, Agent, or Firm* — Wenderoth, Lind & Ponack, L.L.P.

(57) ABSTRACT

A manufacturing method of a vehicular interior part in which a cover member is attached to a base material, comprising the steps of forming a skin material, comprising a plurality of skin pieces sewn together, in accordance with a surface shape of said base material; and forming said cover member by attaching a soft material to a backside of said skin material after forming said skin material in accordance with said surface shape of said base material; and attaching said cover member to said base material.

6 Claims, 12 Drawing Sheets

MANUFACTURING METHOD OF A VEHICULAR INTERIOR PART

This application is a continuation-in-part of U.S. application Ser. No. 11/707,869 filed Feb. 20, 2007 now abandoned.

CROSS REFERENCE TO RELATED APPLICATION

The disclosure of Japanese Patent Application No. JP-2006-044076 filed Feb. 21, 2006 is incorporated herein by reference in its entirety.

BACKGROUND OF THE INVENTION

1. Field of the Invention

The present invention relates to a vehicular interior part and a manufacturing method thereof.

2. Description of the Related Art

According to an conventional art related to a vehicular interior part, for instance, in Japanese Patent Application Publication No. JP-A-2002-79852 (pages 3-4 and FIG. 2), a cover comprising a plurality of skin materials joined together is covered on a surface of a plastic base material. The cover according to the conventional art is structured as follows: a pair of skin materials is overlapped with their right sides of the skin together, then is sewn together with respective edges thereof aligned, and thereafter, each of the pair of the skin materials is spread in the opposite direction from each other. Accordingly, a certain width of a seam allowance protrudes toward the backside from a stitch portion of the cover. As a consequence, when the cover is covered over the surface of the base material, there is a disadvantage that the seam allowance protrudes from the surface of the base material and creating a bulge on the surface of a vehicular interior part. To solve the problem, the vehicular interior part according to the conventional art has a concave portion provided on the surface of the base material to accommodate the seam allowance. This structure thus prevents formation of the bulge on the surface of the vehicular interior part caused by the seam allowance of the cover. Accordingly, the vehicular interior part according to the conventional art has an advantage that the seam allowance of the cover does not protrude from the surface, thereby allowing the surface to be smooth and have a good appearance.

However, the vehicular interior part according to the conventional art must be provided with the concave portion on the surface of the base material to accommodate the seam allowance of the cover. Therefore, a forming die to form the base material becomes complicated. As a result, the cost for manufacturing the base material becomes high and, in some cases, it may be difficult to perform die cutting of the base material during the forming process.

On the other hand, according to other conventional art, there exists a vehicular interior part in which a cover is formed by attaching a cushion material to a backside of a skin material while avoiding a seam allowance of a stitch portion, and then the cover is adhered to a surface of a base material. In the case in which the cover is attached to the surface of the base material, intervention of the cushion material prevents the seam allowance from protruding from the surface of the base material. Accordingly, without requiring the surface of the base material to be provided with a concave portion to accommodate the seam allowance, this structure can prevent formation of a bulge on the surface of the vehicular interior part and can also allow the surface of the vehicular interior part to be flat and have a good appearance.

According to the vehicular interior part of the conventional art, the cushion material is attached to the backside of the skin material before simultaneously forming the skin material and the cushion material into a certain shape in accordance with a surface shape of the base material. Therefore, a stress is caused on the cushion material due to factors such as a difference in the elongation of the skin material and the cushion material. This stress then creates problems such as formation of a crease on the skin material, which significantly degrades the appearance of the surface of the vehicular interior part.

The present invention has been made in consideration of the aforementioned circumstances, and it is an object of the present invention to provide a vehicular interior part with a good appearance and a manufacturing method thereof.

SUMMARY OF THE INVENTION

In accordance with the present invention provides a method for manufacturing a vehicular interior part in which a cover member is attached to a base material. The manufacturing method includes the steps of forming a skin material which is composed of a plurality of skin pieces joined by sewing, in accordance with a surface shape of the base material; forming the cover member by attaching a soft material to a backside of the skin material after the skin material is formed in accordance with the surface shape of the base material; and attaching the cover member to the base material. According to this method, the soft material is attached to the backside of the skin material after the skin material is formed in accordance with the surface shape of the base material. As a result, no stress is created on the soft material due to factors such as a difference in the elongation of the skin material and the soft material, thus preventing formation of a crease or the like on the skin material. In consequence, a vehicular interior part having a good appearance can be obtained.

According to the present invention, in the steps of forming the skin material in accordance with the surface shape of the base material, it is preferable to form the skin material by sequentially being suctioned each portion of the skin material toward the die surface via the vent holes after placing the skin material on a forming die provided with vent holes on a die surface. This is because, if the entire skin material is suctioned at one time, the skin material is pulled into the vent holes by a suction force applied to the entire skin material. In addition, when the skin material is pulled into the vent holes, the dimension of the skin material laid out on the forming die decreases, thus making it difficult to adhere the soft material to the backside of the skin material.

Furthermore, according to the present invention, a pair of said skin pieces is overlapped with their right sides of the skin together, and then is sewn together with respective edges thereof aligned, and thereafter, each of the pair of the skin pieces is spread in the opposite direction from each other. Therefore, it is preferable that a tape material is attached to an overlapping portion of the edge of the pair of the skin pieces. This enables to increase the rigidity of the overlapping portion of the edge of the skin pieces while preventing from meandering and opening-up of the sewing portion of the pieces.

DETAILED DESCRIPTION OF THE PREFERRED EMBODIMENTS

An illustrative example of the present invention is described in reference to FIGS. 1 to 11.

Figure 1:
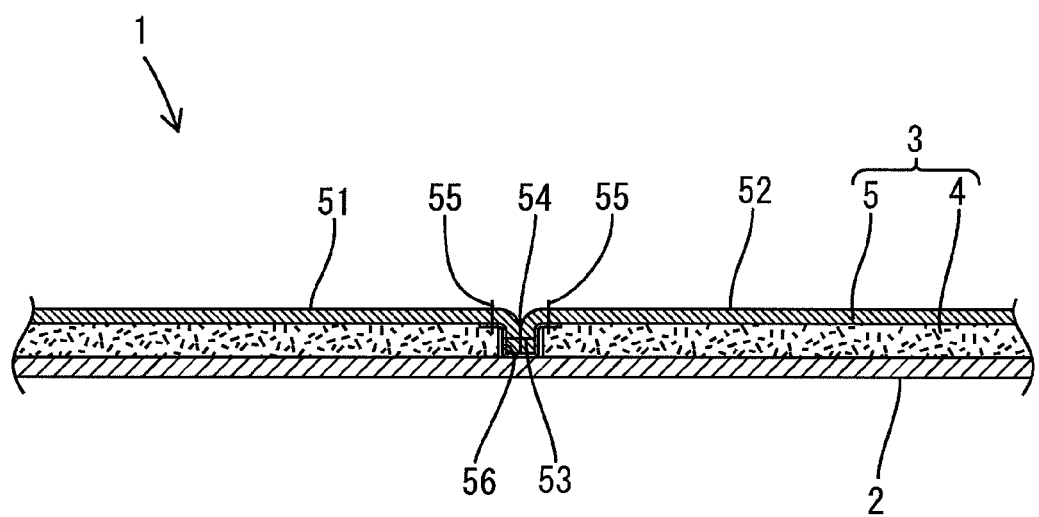
FIG. 1 is a sectional view of a vehicular interior part according to an illustrative example of the present invention.

Referring to FIG. 1, a vehicular interior part according to the present illustrative example includes a base material 2 and a cover member 3 attached to a surface of the base material 2.

The base material 2 is an instrument panel of a vehicle. The base material 2 is integrally formed by resin such as polypropylene and is installed in front of a front seat or a driver's seat of the vehicle.

The cover member 3 includes a skin material 5 and a cushion material 4 attached to the backside of the skin material 5.

The skin material 5 includes a plurality of skin pieces 51 and 52 that are joined together by sewing. The plurality of skin pieces 51 and 52 are made of an animal skin (genuine leather) such as a cowhide, and are sewn together by a sewing thread 53.

The skin material 5 is formed in three dimensions in accordance with the surface shape of the base material 2. An outer surface of the skin material 5 is formed with a plurality of sewing lines 54. Furthermore, on the sides of the sewing line 54 of the skin material 5, a pair of decorative stitches 55 (double stitch) is provided such that the sewing lines 54 is interposed therebetween.

The backside of the skin material 5 is attached with the cushion material 4 having an adequate flexibility. The cushion material 4 is attached to the base material 2 so that the vehicular interior part 1 has a pleasant tactility. The cushion material 4 is not limited by this, but can be such that a resin loop material is provided between a pair of opposing fabrics. The cushion material 4 has an appropriate elasticity. The cushion material 4 corresponds to a soft material in the present invention.

An overlapping portion at the edge of the skin pieces 51 and 52 is attached with a hot melt tape 56. The attachment of the hot melt tape 56 reinforces the overlapping portion at the edge of the skin pieces 51 and 52. Furthermore, the overlapping portion at the edge of the skin pieces 51 and 52 serves as a seam allowance for sewing the skin pieces 51 and 52 together. The hot melt tape 56 corresponds to a tape material in the present invention.

As shown in FIG. 1, the cushion materials 4 are attached to the backside of the skin material 5 except for the overlapping portion where the ends of the skin pieces 51 and 52 are sewn together and for around the overlapping portion. The length of the overlapping portion is defined so that an edge of the overlapping portion is separated from the surface of the base material 2, that is, a part of the skin material 5 is not raised from the surface thereof by the edge touching the surface of the base material 2. Namely, it is defined such that a length from the inner surface of the skin material 5 to the edge of the overlapping portion is smaller than the thickness of the cushion material 4 when the cover member 3 is attached to the base material 2.

Next, a forming unit 6 for forming the skin material 5 will be explained with reference to FIGS. 2 and 7.

The forming unit 6 includes a movable support stand 61 equipped with casters, a vacuum box 62 disposed on the support stand 61, and a reversal die 63 disposed on the vacuum box 62. The reversal die 63 is a forming die to form the skin material 5.

Figure 7:
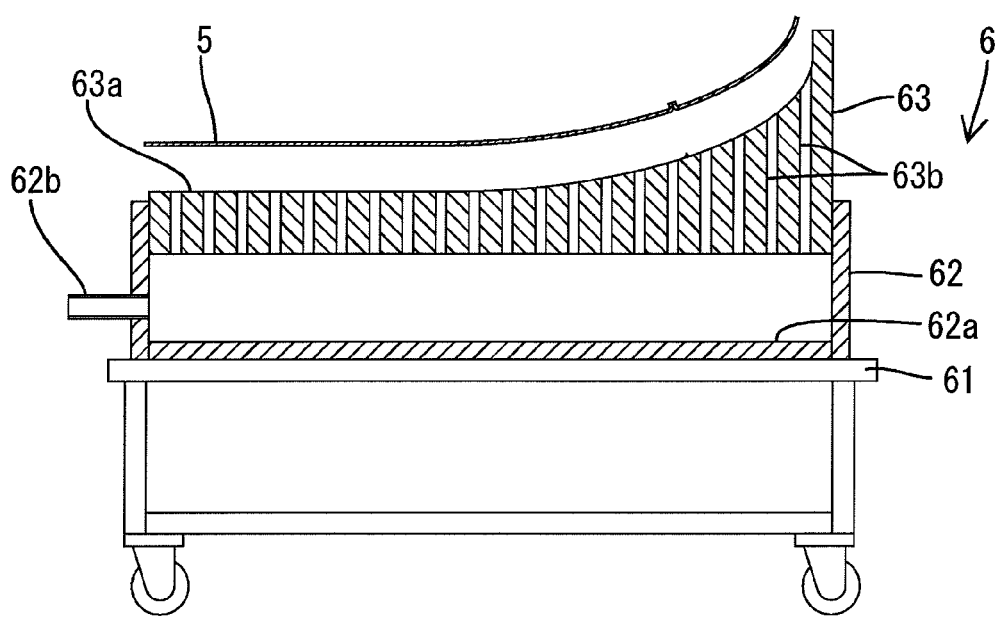
FIG. 7 is a sectional view showing a state in which the skin material is placed on a reversal die.

The vacuum box 62 is formed in a box-like shape by the wood or the like (refer to FIG. 7). Inside the vacuum box 62 is formed with an empty space 62a. The side surface of the vacuum box 62 is provided with a plurality of vacuum suction openings 62b that are connected to the empty space 62a. The vacuum suction opening 62b is connected with a vacuum pump via a switching valve (not shown). This configuration enables the empty space 62a to be vacuum. In addition, the side surface of the vacuum box 62 is provided with a plurality of vents 62c for temperature control (refer to FIG. 2). The vents 62c are connected with conduit lines which pass through the vacuum box 62 to be connected to the inside of the reversal die 63. Conduit lines are used to control the temperature of the reversal die 63 during forming.

The reversal die 63 which is formed of epoxy resin is a forming die for forming the skin material 5 in accordance with the surface shape of the base material 2. The reversal die 63 is formed in a shape that corresponds to the reversed shape of the outer surface of the skin material 5 in a state of covering the base material 2.

As shown FIG. 7, the reversal die 63 is provided with a plurality of small vent holes 63b that vertically pass through the reversal die 63. A die surface 63a which is the upper surface of the reversal die 63 and the empty space 62a in the vacuum box 62 located under the reversal die 63 are connected each other via the vent holes 63b. Because of this structure, when the empty space 62a in the vacuum box 62 becomes vacuum, the skin material 5 placed on the reversal die 63 is suctioned toward the die surface 63a.

Figure 2:
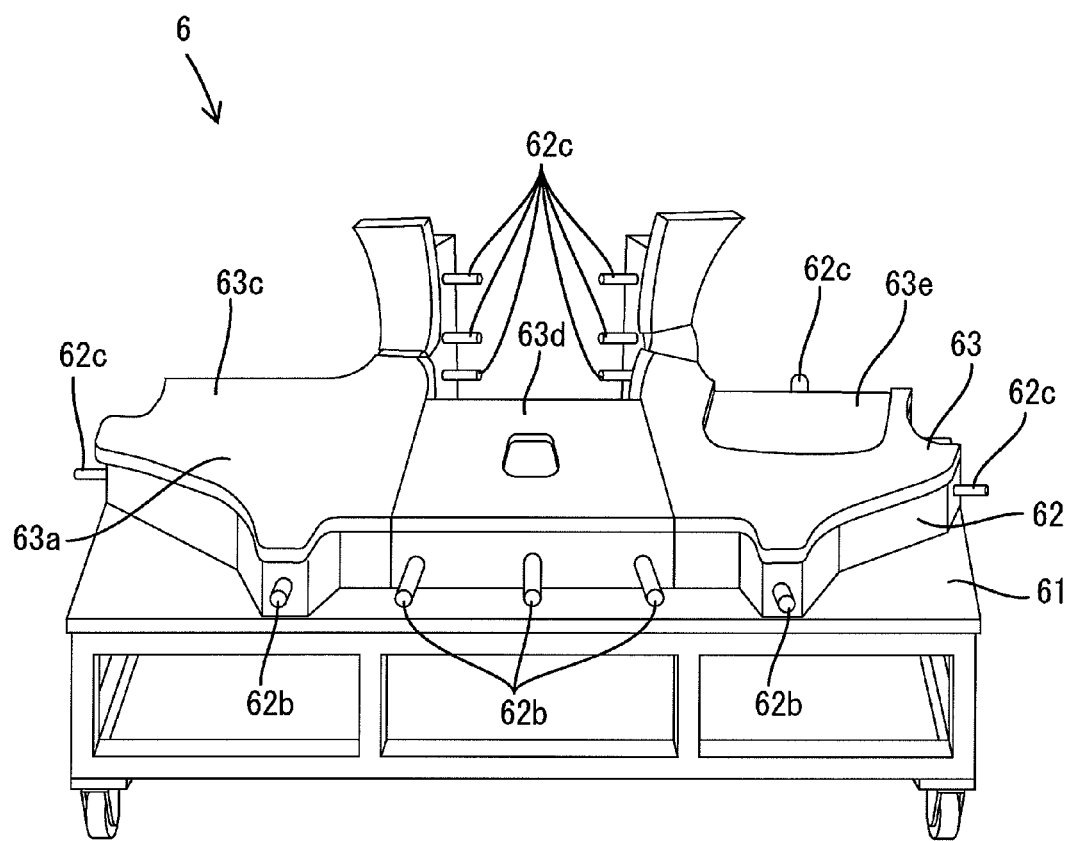
FIG. 2 is an illustration of an appearance of a forming unit used for manufacturing the vehicular interior part shown in FIG. 1.

Furthermore, as shown FIG. 2, the reversal die 63 is divided into three portions: a glove compartment upper portion 63c, a center cluster upper portion 63d, and a meter hood portion 63e. Likewise, the empty space 62a in the vacuum box 62 is also divided into three chambers corresponding to the aforementioned three portions. The vacuum suction opening 62b is connected with a vacuum pump via the aforementioned switching valve. The vacuum pump and the switching valve enable each of the three chambers in the vacuum box 62 to be vacuumed.

Furthermore, the die surface 63a of the reversal die 63 is provided with a positioning line (not shown) used when forming the skin material 5.

Next, referring to FIGS. 3 to 11, a manufacturing method of the vehicular interior part 1 according to the present illustrative example will be explained.

Figure 3:
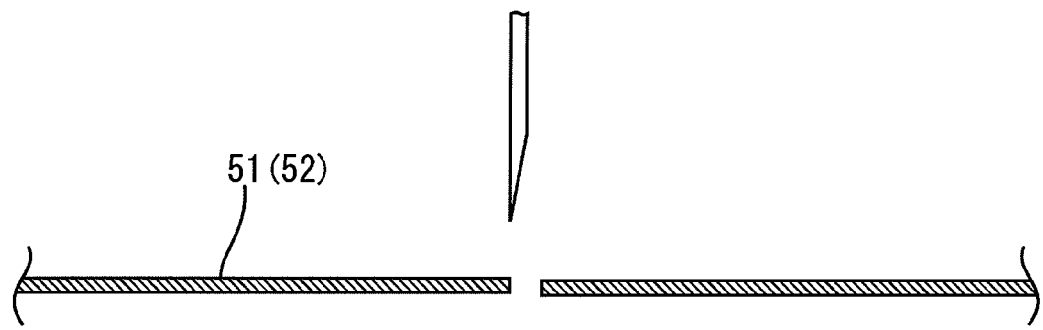
FIG. 3 is a sectional view showing a step of cutting out a skin piece of a skin material.
Figure 4:
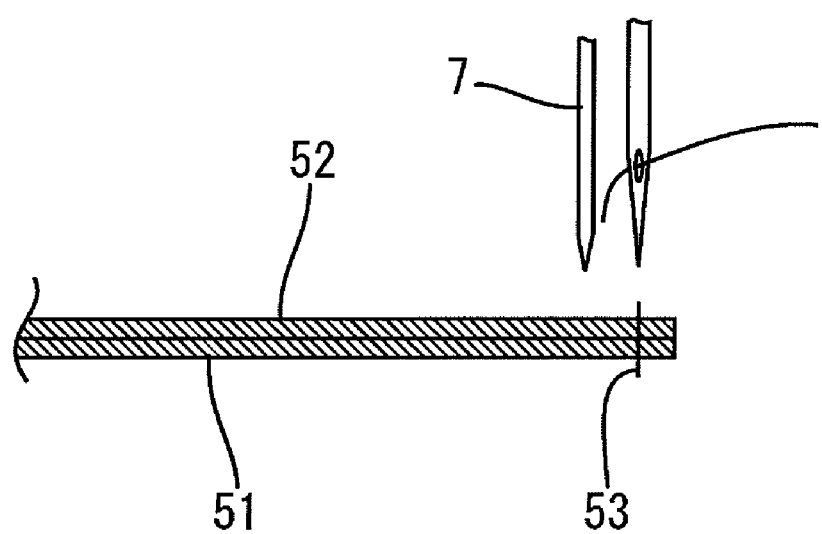
FIG. 4 is a sectional view showing a step of applying an in-stitch on a pair of skin pieces constructing the skin material.

First, the periphery of genuine leather such as a cowhide is cut off to make a plurality of the skin pieces 51 and 52 of a certain shape (refer to FIG. 3).

Next, a pair of the skin pieces 51 and 52 is overlapped with their right sides of the skin together, then are sewn together with respective edges thereof aligned (i.e. 'in-stitch'). This process joins the pair of the skin pieces 51 and 52. At the same time, a marking-off line that serves as a positioning line for attaching the cushion material 4 is applied on the backside of the skin material 5 with a marking device 7 (such as a scratch gauge) (refer to FIG. 4).

Figure 5:
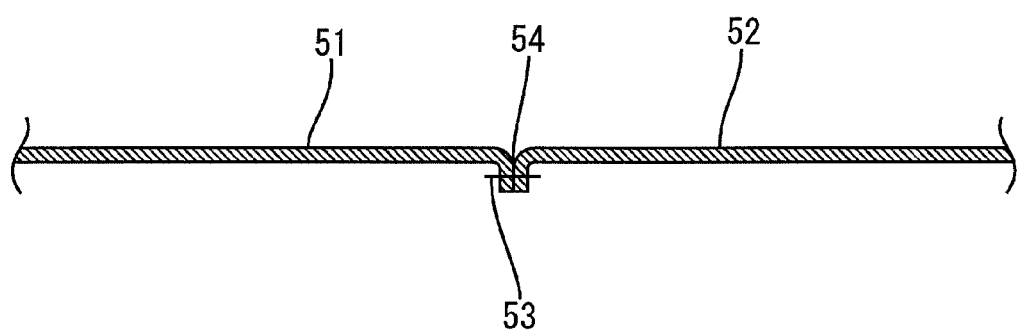
FIG. 5 is a sectional view showing a state in which, a pair of the skin pieces are sewn together with respective edges, and thereafter, each of the pair of the skin pieces is spread in the opposite direction from each other.

Each of the pair of the skin pieces 51 and 52 sewn together is spread in the opposite direction from each other (refer to FIG. 5). Subsequently, an overlapping portion formed on the backside of the pair of the skin pieces 51 and 52 (that is, the bottom face in FIG. 5) is attached with a hot melt tape 56. The overlapping portion serves as a seam allowance. After being disposed on the predetermined portion of the skin pieces 51 and 52, the hot melt tape 56 exhibits its adhesiveness by being heated.

Figure 6:
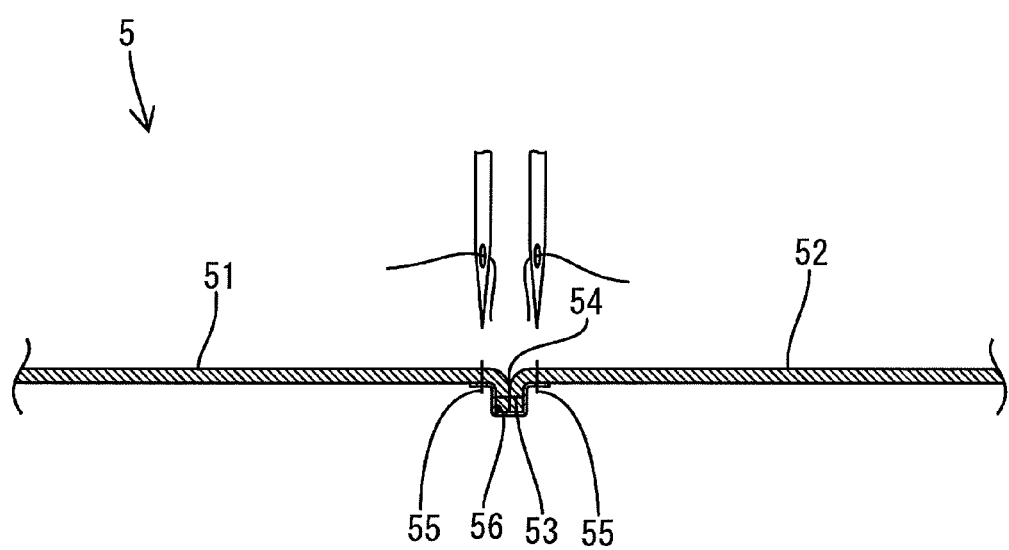
FIG. 6 is a sectional view showing a state in which a hot melt tape is attached to an overlapping portion at the edge of the skin pieces.

Finally, the skin material 5 is completed by applying a pair of decorative stitches 55 (i.e., double stitch) on the surface of the respective skin pieces 51 and 52 such that the sewing line 54 is interposed between the decorative stitches 55 (refer to FIG. 6).

The skin material 5 that is completed by joining the plurality of skin pieces 51 and 52 is placed on the reversal die 65 in such a manner as to cover the entire die surface 63a shown in FIG. 2 with the front face (i.e., the upper surface in FIG. 6) of the skin material 5 in contact with the die surface 63a.

When placing the skin material 5 on the reversal die 65, the sewing line 54 is aligned with the positioning line provided on the die surface 63a. This enables an accurate positioning of the skin material 5 on the reversal die 65.

After the skin material 5 is placed on the reversal die 65, the vacuum pump and the switching valve are operated to sequentially vacuum the three chambers dividing the vacuum box 62. Of the three chambers in the vacuum box 62, the first chamber to be vacuumed is a chamber under the glove compartment upper portion 63c. Next chamber to be vacuumed is a chamber under the center cluster upper portion 63d, followed by, a chamber under the meter hood portion 63e. Accordingly, the skin material 5 can be suctioned sequentially toward the die surface 63a by portions.

Figure 8:
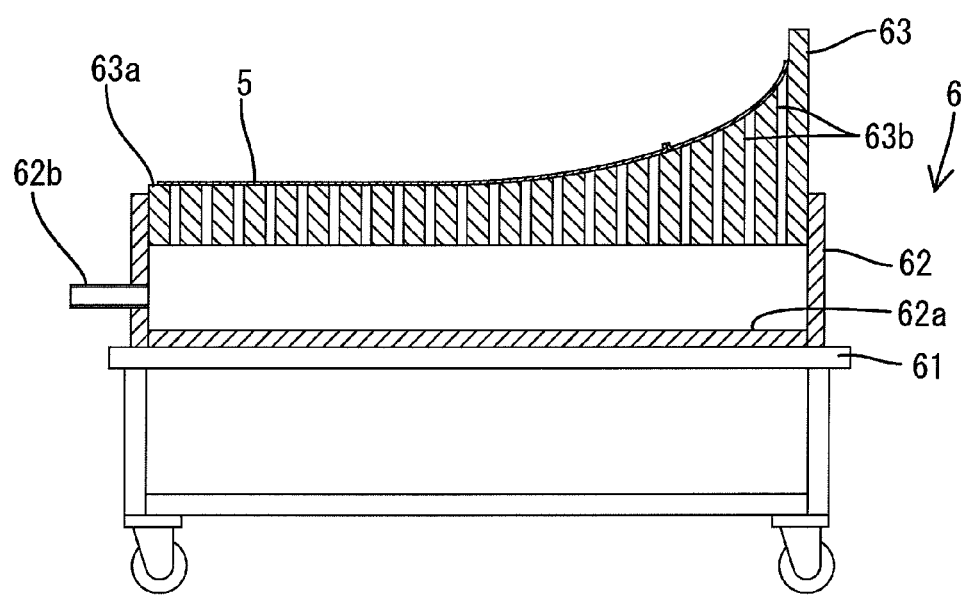
FIG. 8 is a sectional view showing a step of forming the skin material.
Figure 9:
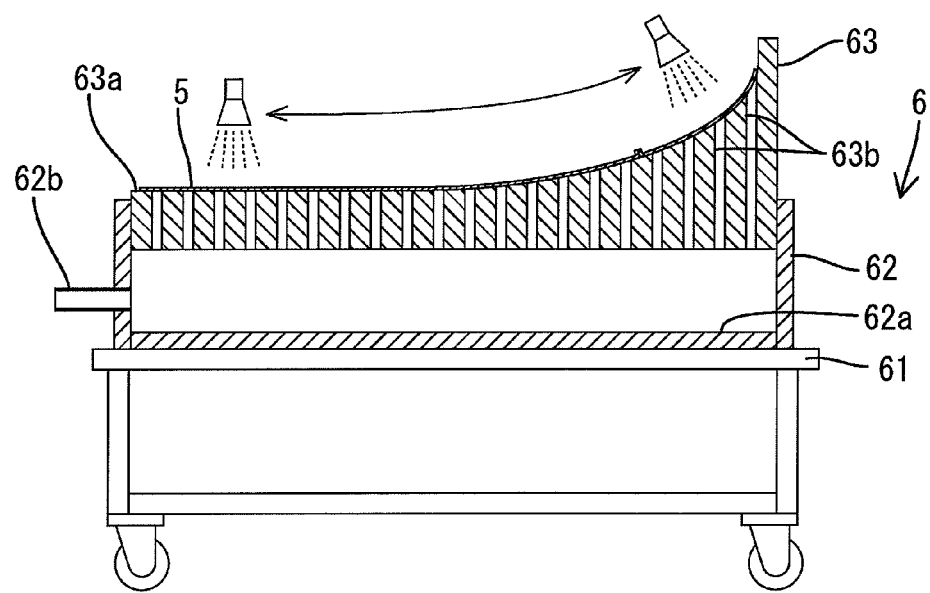
FIG. 9 is a sectional view showing a step of applying adhesive to the skin material.
Figure 10:
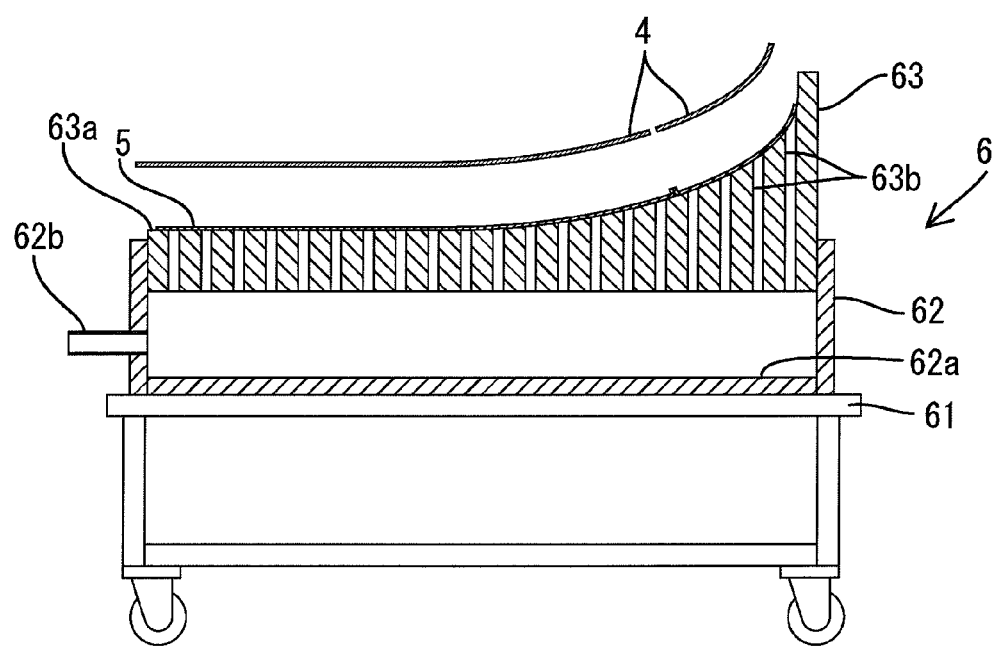
FIG. 10 is a sectional view showing a step of setting a cushion material on the skin material.
Figure 11:
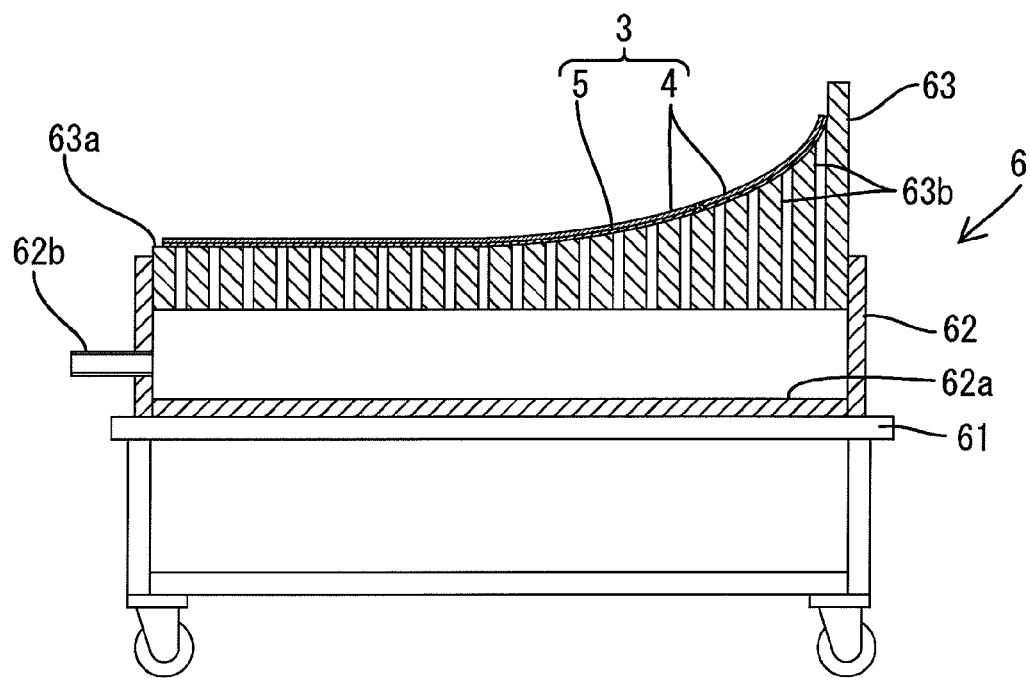
FIG. 11 is a sectional view showing a step of attaching the cushion material to the backside of the skin material.

Firstly, the skin material 5 is suctioned to the die surface 63a of the glove compartment upper portion 63c, thereby forming only a portion of the skin surface 5 into a certain three-dimensional shape (refer to FIG. 8).

Next, the skin material 5 is suctioned to the die surface 63a of the center cluster upper portion 63d, thereby forming only a portion of the skin surface 5 into a certain three-dimensional shape.

Lastly, the skin material 5 is suctioned to the die surface 63a of the meter hood portion 63e, thereby forming only a portion of the skin surface 5 into a certain three-dimensional shape.

After the skin material 5 is formed, while maintaining the vacuum state in the vacuum box 62, the cushion material 4 with adhesive pre-applied is attached to the backside of the skin material 5. Alternatively, the adhesive is sprayed onto the backside of the skin material 5 before attaching the cushion material 4 to the backside of the skin material 5. Accordingly, the cushion material 4 can be attached to the backside of the skin material 5 (refer to FIGS. 9 and 10). At this time, the cushion material 4 can be easily positioned onto the skin material 5 by aligning a marking-off line provided on the backside of the skin material 5 with the outline of the outer periphery of the cushion material 4.

The cover member 3 is completed by attaching the cushion material 4 to the backside of the skin material 5 after the skin material 5 is formed by the reversal die 63. The cover member 3 is then attached to the surface of the base material 2 using a special attaching device or the like.

As described above, according to the present illustrative example, a portion of the skin material 5 can be sequentially being suctioned toward the die surface 63a. In consequence, the skin surface 5 can be formed by portions. In addition, the cushion material 4 can be attached to the backside of the skin material 5 by portions According to the present illustrative example, the skin material 5 is formed in accordance with the surface shape of the base material 2, and then the cushion material 4 is attached to the backside of the skin material 5. Consequently, no stress is caused on the cushion material 4 due to factors such as a difference in the elongation of the skin material 5 and the cushion material 4. Correspondingly, no crease or the like is created on the surface of the skin material 5, thereby enabling manufacturing of the vehicular interior part 1 having a good appearance.

The surface material 5 is placed on the reversal die 63 and is then sequentially being suctioned toward the die surface 63a by portions. Accordingly, the skin material 5 is not pulled into the vent holes 63b, and the dimension of the skin material 5 does not decrease either. Consequently, the operation of attaching the cushion material 4 to the skin material 5 does not become complicated.

On the contrary, if the entire skin material 5 is being suctioned at one time, a suction force applied to the entire skin material 5 pulls the skin material 5 into the vent holes 63b. Accordingly, the dimension of the skin material 5 placed on the reversal die 63 decreases, thus making it difficult to attach the cushion material 4 to the backside of the skin material 5.

The skin material 5 is formed as follows. Of a plurality of the skin pieces, a pair of skin pieces 51 and 52 is overlapped with their right sides of the skin together, and then is sewn together with respective edges thereof aligned, and thereafter, each of the pair of skin pieces 51 and 52 is spread in the opposite direction from each other. A hot melt tape is attached to an overlapping portion of the edge of the pair of the skin pieces 51 and 52. This enables to increase the rigidity of the overlapping portion of the edge of the skin pieces 51 and 52 while preventing from meandering and opening-up of the sewing portion of the skin pieces 51 and 52.

Other Illustrative Examples

The present invention is not limited by the illustrative example by explanation above and drawings, for example, the illustrative example described below is included within the technical range of the present invention. Furthermore, other than the illustrative example described below, various improvements and modifications are possible within the scope of the present invention.

(1) The skin material may not only be a cowhide but can also be a synthetic leather or the like.

(2) The soft material to be attached to the backside of the skin material may be a cushion material such as a foamed urethane and a sponge.

(3) The present invention can be applied to not only an instrument panel but also other vehicular interior parts such as a door trim for vehicles.

(4) Respective portions of the skin material can be formed in any sequence.

Figure 12:
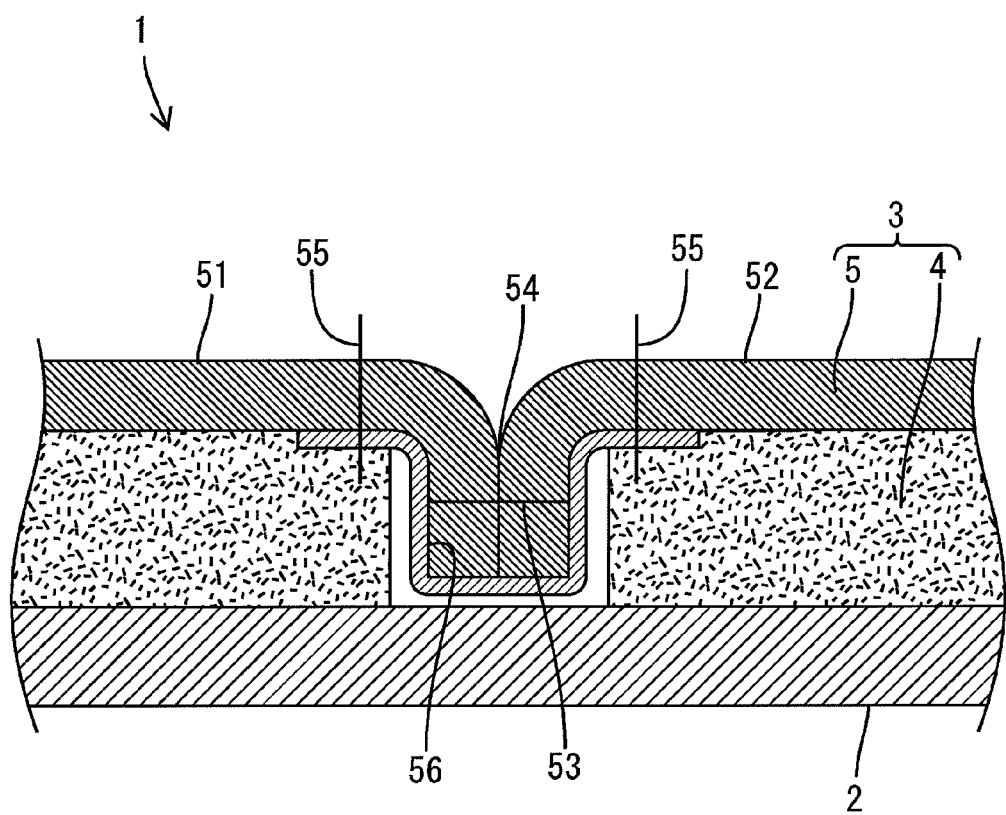
FIG. 12 is a magnified sectional view of a vehicular interior part according to a modification of the first embodiment.

(5) As shown in FIG. 12, a space larger than that shown in FIG. 1 may be provided between the edge of the overlapping portion of the skin material 5 and the base material 2.

What is claimed is:

1. A manufacturing method of a vehicular interior part in which a cover member including a skin material and soft materials is attached to a base material, the method comprising:
    preparing the skin material including a plurality of skin pieces;
    overlapping a pair of the skin pieces with their right sides of skin together;
    sewing the pair of skin pieces together with respective edges thereof aligned such that an overlapping portion of the pair of skin pieces is formed;
    after said sewing of the pair of skin pieces, spreading the pair of skin pieces so as to extend in opposite directions from each other;
    after said spreading of the pair of skin pieces, shaping the pair of skin pieces so as to fit a surface of the base material;
    after said shaping of the pair of skin pieces, attaching the soft materials to respective backsides of the pair of skin pieces except for the overlapping portion and around the overlapping portion such that the overlapping portion is arranged between the soft materials; and
    after said attaching of the soft materials, attaching bottom surfaces of the soft materials to a top surface of the base material such that an edge of the overlapping portion is separated from the surface of the base material.

2. The manufacturing method of a vehicular interior part according to claim 1, wherein a space is provided between the edge of the overlapping portion and the base material.

3. The manufacturing method of a vehicular interior part according to claim 2, wherein:
    the pair of skin pieces are sewn together for a length defined so that a part of the skin material is not raised from the surface of the base material by ends of the overlapping portion touching the surface of the base material; and
    the soft materials have a thickness larger than a length from an inner surface of the skin material to an edge of the overlapping portion when the cover member is attached to the base material.

4. The manufacturing method of a vehicular interior part according to claim 1, wherein:
    the pair of skin pieces are sewn together for a length defined so that a part of the skin material is not raised from the surface of the base material by ends of the overlapping portion touching the surface of the base material; and
    the soft materials have a thickness larger than a length from an inner surface of the skin material to an edge of the overlapping portion when the cover member is attached to the base material.

5. The manufacturing method of a vehicular interior part according to claim 1, wherein:
    said shaping of the pair of skin pieces includes
        placing the pair of skin pieces over a forming die having a vent hole in a die surface, and
        sequentially suctioning the pair of skin pieces toward the die surface via the vent hole by portions such that the pair of skin pieces are shaped by the portions; and
    said attaching of the soft materials includes attaching portions of the soft materials to corresponding backsides of the portions of the pair of skin pieces.

6. The manufacturing method of a vehicular interior part according to claim 1, wherein the pair of skin pieces are separated from each other such that the overlapping portion extends vertically from parts of the skin pieces other than the overlapping portion along edge surfaces of the soft materials.

* * * * *